US012577986B2

(12) United States Patent
Myers

(10) Patent No.: US 12,577,986 B2
(45) Date of Patent: Mar. 17, 2026

(54) LOCKING DEVICE FOR THREADED ADJUSTER

(71) Applicant: Dana Automotive Systems Group, LLC, Maumee, OH (US)

(72) Inventor: Chane E. Myers, Waldron, MI (US)

(73) Assignee: DANA AUTOMOTIVE SYSTEMS GROUP, LLC, Maumee, OH (US)

( * ) Notice: Subject to any disclaimer, the term of this patent is extended or adjusted under 35 U.S.C. 154(b) by 246 days.

(21) Appl. No.: 18/314,553

(22) Filed: May 9, 2023

(65) Prior Publication Data

US 2024/0376928 A1    Nov. 14, 2024

(51) Int. Cl.
| | |
|---|---|
| *F16C 35/06* | (2006.01) |
| *F16C 19/36* | (2006.01) |
| *F16C 25/06* | (2006.01) |
| *F16C 35/067* | (2006.01) |

(52) U.S. Cl.
CPC .......... *F16C 35/067* (2013.01); *F16C 19/364* (2013.01); *F16C 25/06* (2013.01); *F16C 2226/60* (2013.01); *F16C 2229/00* (2013.01); *F16C 2326/06* (2013.01); *F16C 2361/61* (2013.01)

(58) Field of Classification Search
CPC ........ F16C 19/364; F16C 25/06; F16C 25/08; F16C 25/083; F16C 35/067; F16C 2226/60; F16C 2229/00; F16C 2326/06; F16C 2361/61
See application file for complete search history.

(56) References Cited

U.S. PATENT DOCUMENTS

| | | | | |
|---|---|---|---|---|
| 904,343 | A | * | 11/1908 | Makutchan ........... F16C 19/386 384/589 |
| 3,211,022 | A | * | 10/1965 | Anderson ............... F16H 48/26 475/85 |
| 3,320,835 | A | | 5/1967 | Flory et al. |
| 3,825,099 | A | * | 7/1974 | Hopf ................... F16H 57/0421 184/6.12 |
| 4,613,240 | A | * | 9/1986 | Hagelthorn ........... F16C 19/548 384/585 |
| 4,798,394 | A | * | 1/1989 | Pollock ................... B62D 7/18 280/93.512 |
| 6,904,681 | B2 | | 6/2005 | Slesinski |
| 7,581,795 | B1 | * | 9/2009 | Chen ..................... B60B 27/023 301/110.5 |
| 8,475,320 | B2 | | 7/2013 | Kwon |
| 9,207,102 | B2 | | 12/2015 | Metzger et al. |
| 10,400,600 | B2 | * | 9/2019 | Hutsler ................. F16H 57/021 |
| 2004/0059331 | A1 | | 3/2004 | Mullaney |
| 2016/0281785 | A1 | * | 9/2016 | Campbell ............. F16C 35/067 |

FOREIGN PATENT DOCUMENTS

CA          2863789 C      7/2018

* cited by examiner

*Primary Examiner* — Alan B Waits
(74) *Attorney, Agent, or Firm* — McCoy Russell LLP

(57) ABSTRACT

Methods and systems are provided for a bearing assembly of a vehicle. In one example, the bearing assembly includes a bearing coupled to a shaft and a threaded bearing adjuster in contact with the bearing and configured to apply a target amount of preload to the bearing. The bearing assembly may further include a locking ring in face-sharing contact with the threaded bearing adjuster. The locking ring may have a threaded outer surface that, when engaged with threading of a vehicle component, inhibits axial translation of the threaded bearing adjuster away from the bearing.

13 Claims, 9 Drawing Sheets

LOCKING DEVICE FOR THREADED ADJUSTER

TECHNICAL FIELD

The present description relates generally to methods and systems for providing preload at a bearing.

BACKGROUND AND SUMMARY

For vehicle components configured to receive an end of a shaft, such as a differential, a transmission, an electric motor, etc., preloading a bearing of the component may be desirable. Preload may be an axial or thrust load applied to the bearing to minimize excess play. This load may remove clearance between the rolling elements of the bearing which may otherwise cause sliding of the rolling elements or allow misalignment to occur. An amount of preload applied to the bearing may depend on parameters of a particular system in which the bearing is used, including bearing size, target stiffness, initial torque, operating torque, loading parameters, amongst others. Preload may therefore be adjusted according to demands of a specific system.

In some examples, preload may be applied using a threaded bearing adjuster, which may be coupled to the bearing with the bearing arranged between the threaded bearing adjuster and the shaft. The threaded bearing adjuster may, however, loosen, e.g., back off, during assembly and/or operation of the vehicle. A resulting loss of preload may reduce axial stability of the shaft and cause the shaft to wobble while rotating. To restabilize the shaft, re-alignment of the threaded bearing adjuster may be demanded, which may be time consuming and laborious. As such, a strategy for mitigating loosening of the threaded bearing adjuster is desirable.

In one example, the issues described above may be addressed by a bearing assembly comprising a bearing coupled to a shaft, a threaded bearing adjuster in contact with the bearing and configured to apply a target amount of preload to the bearing, and a locking ring in face-sharing contact with the threaded bearing adjuster. The locking ring may have an outer surface with threading that, when engaged with threading of a component, such as a vehicle component, inhibits axial translation of the threaded bearing adjuster away from the bearing. In this way, preload may be delivered to the bearing with increased precision while loss of preload at the bearing during vehicle operation may be mitigated.

As one example, the locking ring and the threaded bearing adjuster may both be installed in a tapped bearing seat of a vehicle drivetrain or powertrain component, with the threaded bearing adjuster positioned between the locking ring and the bearing. The locking ring and the threaded bearing may have threading that winds in opposite directions, which causes the locking ring and the threaded bearing adjuster to translate in opposite directions along a central axis of rotation of the bearing assembly when the locking ring and the threaded bearing adjuster are rotated in a common direction.

Alternatively, the locking ring may be coupled to a cap configured to cover an opening of the tapped bearing seat and the threaded bearing adjuster may be installed in the tapped bearing seat. The locking ring may be coupled to the cap via engagement of threading such that the locking ring is in face-sharing contact with the threaded bearing adjuster when the cap is covering the opening of the tapped bearing seat. The locking ring may be threaded to the cap such that the locking ring similarly blocks rotation of the threaded bearing adjuster that leads to axial translation of the threaded bearing adjuster away from the bearing.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
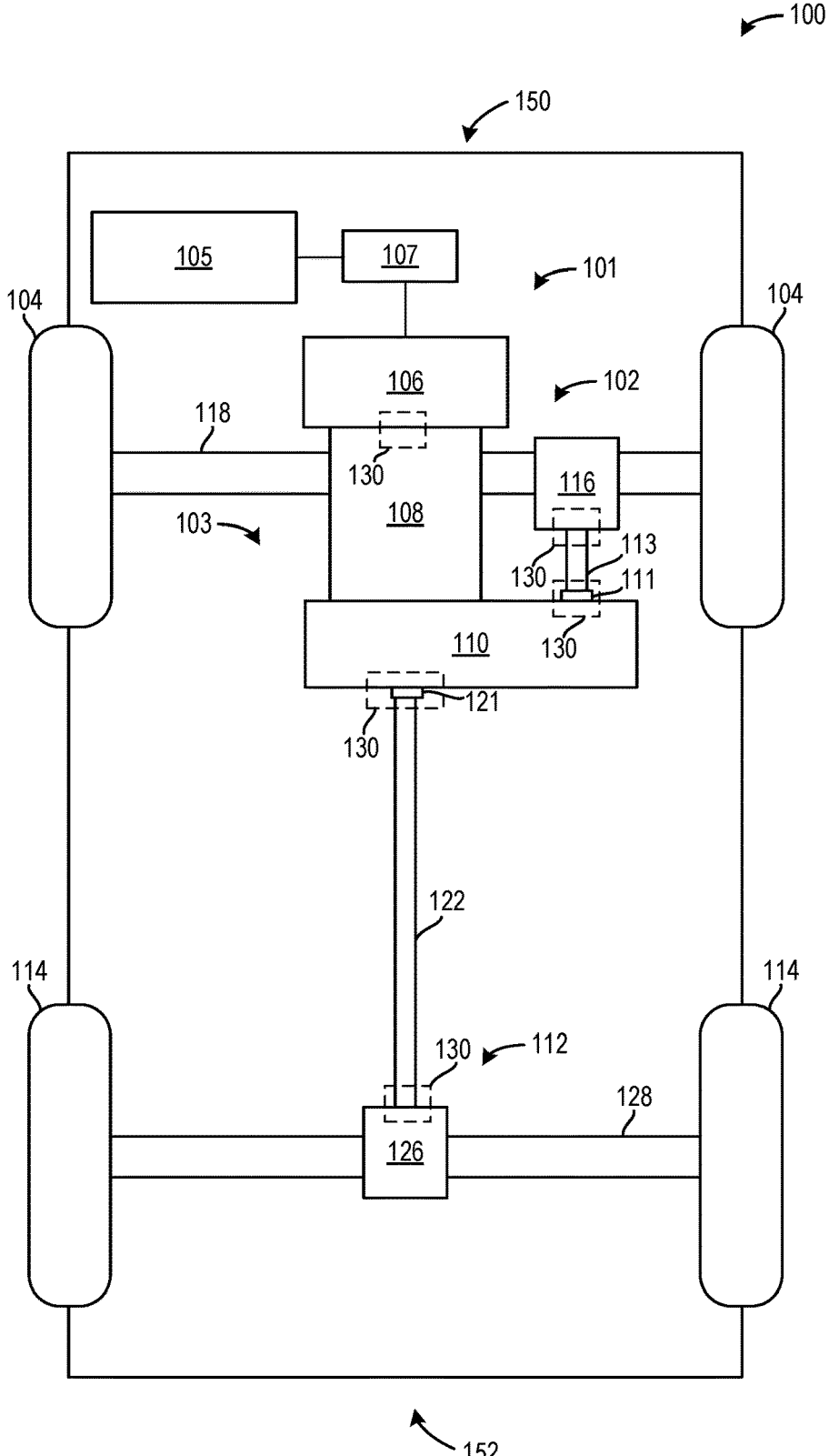
FIG. 1 shows a schematic depiction of an example vehicle powertrain, which may be incorporated in an electric or hybrid electric vehicle with an anti-rotation locking ring in combination with a threaded bearing adjuster.
Figure 2B:
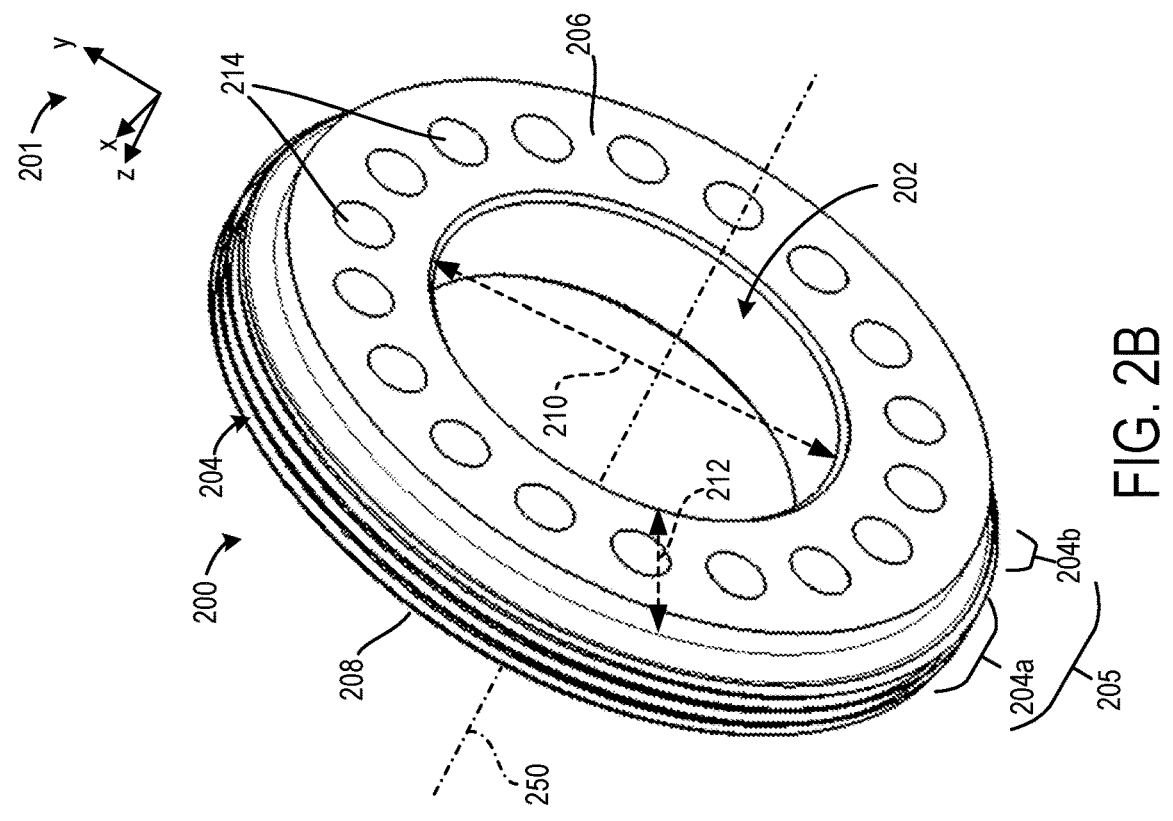
FIG. 2B shows a second view of the anti-rotation locking ring of FIG. 2A.
Figure 2A:
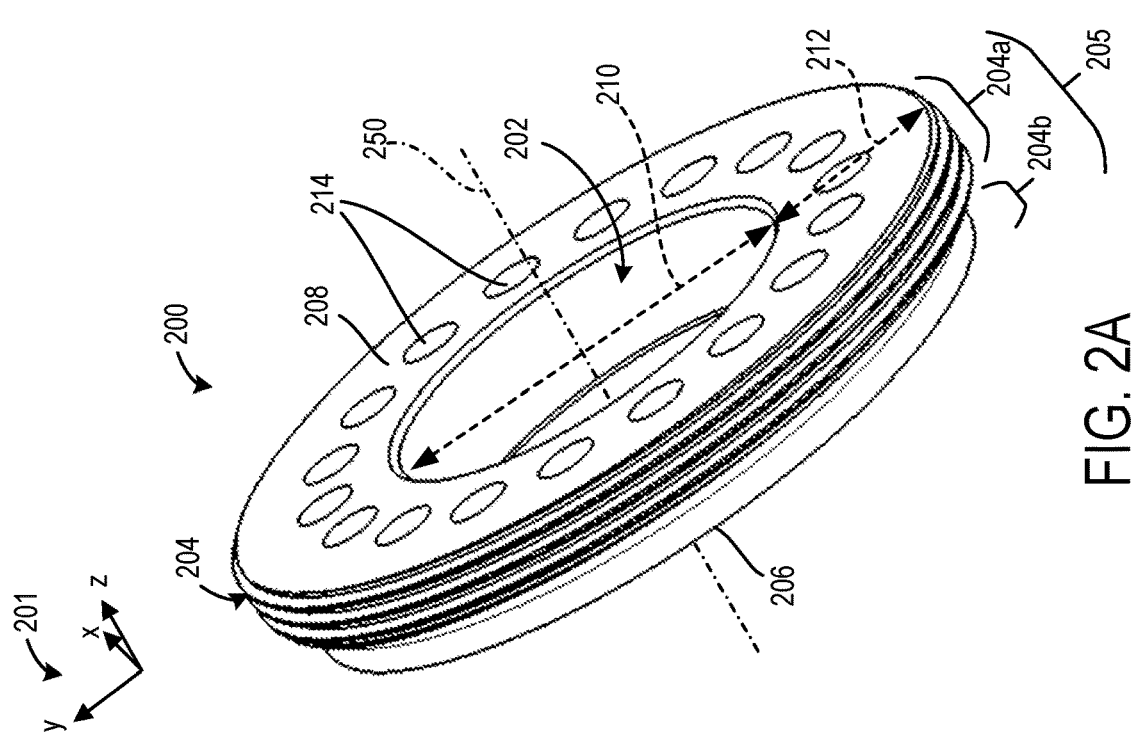
FIG. 2A shows a first view of an example of an anti-rotation locking ring.

The following description relates to systems and methods for applying preload to bearings. In particular, the bearings may be tapered roller bearings used to reduce friction and provide stability at rotating components, such as shafts. For example, as shown in FIG. 1, a vehicle may include various drivetrain and powertrain components, such as transmission, differentials, electric gearboxes, etc., which may be coupled to input shafts. The bearings may be arranged at interfaces between the input shafts and the vehicle component and preload may be delivered to the bearings via devices such as threaded bearing adjusters. To inhibit loosening of the threaded bearing adjusters, and consequent loss of preload, a locking ring that circumvent rotation of the threaded bearing adjuster, e.g., an anti-rotation locking ring, may be arranged in contact with a threaded bearing adjuster, opposite of a bearing, thereby inhibiting axial translation (e.g., along a central axis of rotation) of the threaded bearing adjuster away from the bearing. An example of an anti-rotation locking ring is illustrated in FIGS. 2A and 2B. A threaded bearing adjuster, the anti-rotation locking ring, and a bearing may be included in a bearing assembly for an input shaft. The bearing assembly may be at least partially coupled to a stationary component, such as a housing of a drivetrain or powertrain component. A first example of a bearing assembly, including the anti-rotation locking ring of FIGS. 2A-2B, where all members of the bearing assembly are arranged in the stationary component, is depicted coupled to an input shaft in FIG. 3. The bearing assembly is also shown in an exploded view relative to an electrical gearbox housing in FIG. 4, and in a cross-sectional view in FIG. 5. A second example of a bearing assembly that also includes an anti-rotation locking ring is depicted in FIG. 6 in an exploded view relative to an electric gearbox housing, coupled to an input shaft in FIG. 7, and in a cross-sectional view in FIG. 8. A method for installing a bearing assembly in a stationary vehicle component is shown in FIG. 9.

Turning first to FIG. 1, a vehicle 100 is shown having a powertrain 101 and a drivetrain 103. The powertrain comprises a prime mover 106 and a transmission 108. The prime mover 106 may be an internal combustion engine and/or an electric motor, for example, and is operated to provide rotary power to the transmission 108. The transmission 108 may be any type of transmission, such as a manual transmission, an automatic transmission, or a continuously variable transmission. The transmission 108 receives the rotary power produced by the prime mover 106 as an input and outputs rotary power to the drivetrain 103 in accordance with a selected gear or setting. In one example, when the prime mover 106 is the electric motor, the transmission 108 may instead be an electric gearbox where the electric gearbox may be coupled to the electric motor by a shaft.

The prime mover 106 may be powered via energy from an energy storage device 105. In one example, the energy storage device 105 is a battery configured to store electrical energy. An inverter 107 may be arranged between the energy storage device 105 and the prime mover 106 and configured to adjust direct current (DC) to alternating current (AC).

The vehicle 100 may be a commercial vehicle, light, medium, or heavy duty vehicle, a passenger vehicle, an off-highway vehicle, and or utility vehicle. Additionally or alternatively, the vehicle 100 and/or one or more of its components may be in industrial, locomotive, military, agricultural, and aerospace applications. In one example, the vehicle 100 is an electric vehicle.

In some examples, such as shown in FIG. 1, the drivetrain 103 includes a first axle assembly 102 and a second axle assembly 112. The first axle assembly 102 may be configured to drive a first set of wheels 104, and the second axle assembly 112 may be configured to drive a second set of wheels 114. In one example, the first axle assembly 102 is arranged proximate to a front end 150 of the vehicle 100 and thereby comprises a front axle, and the second axle assembly 112 is arranged proximate to a rear end 152 of the vehicle 100 and thereby comprises a rear axle. The drivetrain 103 is shown in a four-wheel drive configuration, although other configurations are possible. For example, the drivetrain 103 may include a front-wheel drive, a rear-wheel drive, or an all-wheel drive configuration. Further, the drivetrain 103 may include one or more tandem axle assemblies. As such, the drivetrain 103 may have other configurations without departing from the scope of this disclosure, and the configuration shown in FIG. 1 is provided for illustration, not limitation. Furthermore, the vehicle 100 may include additional wheels that are not coupled to the drivetrain 103.

In some four-wheel drive configurations, such as shown in FIG. 1, the drivetrain 103 includes a transfer case 110 configured to receive rotary power output by the transmission 108. A first driveshaft 113 is drivingly coupled to a first output 111 of the transfer case 110, while a second driveshaft 122 is drivingly coupled to a second output 121 of the transfer case 110. The first driveshaft 113 (e.g., a front driveshaft) transmits rotary power from the transfer case 110 to a first differential 116 of the first axle assembly 102 to drive the first set of wheels 104, while the second driveshaft 122 (e.g., a rear driveshaft) transmits the rotary power from the transfer case 110 to a second differential 126 of the second axle assembly 112 to drive the second set of wheels 114. For example, the first differential 116 is drivingly coupled to a first set of axle shafts 118 coupled to the first set of wheels 104, and the second differential 126 is drivingly coupled to a second set of axle shafts 128 coupled to the second set of wheels 114. It may be appreciated that each of the first set of axle shafts 118 and the second set of axle shafts 128 may be positioned in a housing, such as an axle tube, as shown in FIG. 2.

In some examples, additionally or alternatively, the vehicle 100 may be a hybrid vehicle including both an engine and an electric machine each configured to supply power to one or more of the first axle assembly 102 and the second axle assembly 112. For example, one or both of the first axle assembly 102 and the second axle assembly 112 may be driven via power originating from the engine in a first operating mode where the electric machine is not operated to provide power (e.g., an engine-only mode), via power originating from the electric machine in a second operating mode where the engine is not operated to provide power (e.g., an electric-only mode), and via power originating from both the engine and the electric machine in a third operating mode (e.g., an electric assist mode). As another example, one or both of the first axle assembly 102 and the second axle assembly 112 may be an electric axle assembly configured to be driven by an integrated electric machine.

In regions of the vehicle where a shaft interfaces with a device transmitting torque thereto to drive rotation of the shaft, bearings may be used to support the shaft. In particular, the bearings may be tapered roller bearings. The bearings may allow the shaft to rotate with reduced friction, and may mechanically support the shaft and guide rotation of the shaft and components coupled to the shaft. For example, bearings may be arranged at dashed regions 130 indicated in FIG. 1.

In order to stabilize the shaft, preload may be applied to a bearing to eliminate gaps between bearing components that allow for excess play. Preloading the bearing may circumvent sliding and slipping of the bearing. Excess play in the bearing may lead to destabilization of the shaft, causing undesired movement of the shaft which may degrade both the shaft and a component coupled to the shaft. By preloading the bearing, a useful life of the shaft and components may be prolonged.

In one example, a threaded bearing adjuster may be used to provide preload at the bearing. The threaded bearing adjuster may be threaded into a receiving component configured to receive an end of the shaft such that the threaded bearing adjuster is in contact with the bearing. Upon coupling the threaded bearing adjuster to the receiving component the bearing may be compressed, eliminating clearance between the bearing components. An amount of preload applied to the bearing may depend on target parameters for a specific system in which the threaded bearing adjuster is to be used. Applying too little preload may not mitigate wobbling of the shaft while applying too much preload may cause the bearing to overheat and degrade. Thus, it is desirable to maintain a target amount of preload at the bearing using the threaded bearing adjuster.

In conventional examples, a toothed device may be used to maintain a position of threaded bearing adjuster, particularly during installation and assembly of the bearing. For example, a tooth of the toothed device may be inserted between detents protruding from a face of the threaded bearing adjuster, thereby locking the threaded bearing adjuster in place and circumventing further rotation of the threaded bearing adjuster. In order to align the tooth of the tooth device between the detents of the threaded bearing adjuster, however, the threaded bearing adjuster may be adjusted from an orientation providing the target amount of preload to the bearing to allow the tooth to be aligned between the detents. The adjustment of the threaded bearing adjuster may cause the preload delivered to the bearing to deviate from the target amount. A precision of the preload amount provided to the bearing may thereby be degraded.

In other examples, vibrations generating during operation of the vehicle may compel movement of the threaded bearing adjuster. For example, the vibrations may drive rotation of the threaded bearing adjuster in a direction that loosens the threaded bearing adjuster. Over time, the loosening of the threaded bearing adjuster may lead to a loss of preload at the bearing. As described above, insufficient preloading of the bearing may lead to degradation of vehicle components.

Attempts to compensate for the deviation from the target amount of preload may include uninstalling and reinstalling the threaded bearing adjuster, the bearing, and the input shaft in order to achieve the target amount, which may be a time-consuming and laborious process. In addition, an ability to deliver the target amount of preload with high precision may be unreliable.

In one example, as described herein, a locking device may instead be coupled to the threaded bearing adjuster to control and maintain the amount of preload applied to the bearing. For example, the locking device may be an anti-rotation locking ring having threading that winds in a direction opposite of threading of the threaded bearing adjuster. Both the anti-rotation locking ring and the threaded bearing adjuster may have threading disposed along their outer surfaces and may be configured to be coupled to a component receiving the bearing and the input shaft.

By configuring the anti-rotation locking ring with threading that winds in an opposite direction relative to the threaded bearing adjuster, the anti-rotation locking ring may inhibit rotation in a direction away from the bearing. Upon installing the anti-rotation locking ring, no further adjustment to the threaded bearing adjuster is demanded, thus allowing the amount of preload provided to the bearing to remain at the target amount. As a result of using the anti-rotation locking ring instead of conventional devices to lock the threaded bearing adjuster in place, less complex and more cost-effective threaded bearing adjusters may be used. In addition, tools commonly used as drivers for installing vehicle components may be used to install both the threaded bearing adjuster and the anti-rotation locking ring. Further details of the anti-rotation locking ring are provided below, with reference to FIGS. 2A-9.

An example of a locking device for a threaded bearing adjuster is illustrated in FIGS. 2A-2B, from different perspective views. A set of reference axes 201 is provided for comparison between views, including a y-axis, an x-axis, and a z-axis. In one example, the z-axis may be parallel with an axial direction of a shaft coupled to a component in which the locking device is installed and to a central axis of rotation 250 of the locking device. For example, the component may be a differential casing, a transmission or electrical gearbox housing or cover, etc. As described above, the locking device may be a locking ring that inhibits rotation of a threaded component, such as an anti-rotation locking ring 200, which may be a planar disc with a central opening 202 and a threaded outer surface 204.

The outer surface 204 of the anti-rotation locking ring 200 may include a threaded portion 204a extending along a portion of a thickness 205 of the anti-rotation locking ring 200, the thickness 205 defined along the z-axis. Threading of the threaded portion 204a may wind continuously around an entire circumference of the outer surface 204 of the anti-rotation locking ring 200. A remaining portion of the thickness 205 of the anti-rotation locking ring 200, may be an unthreaded portion 204b of the outer surface 204.

Figure 3:
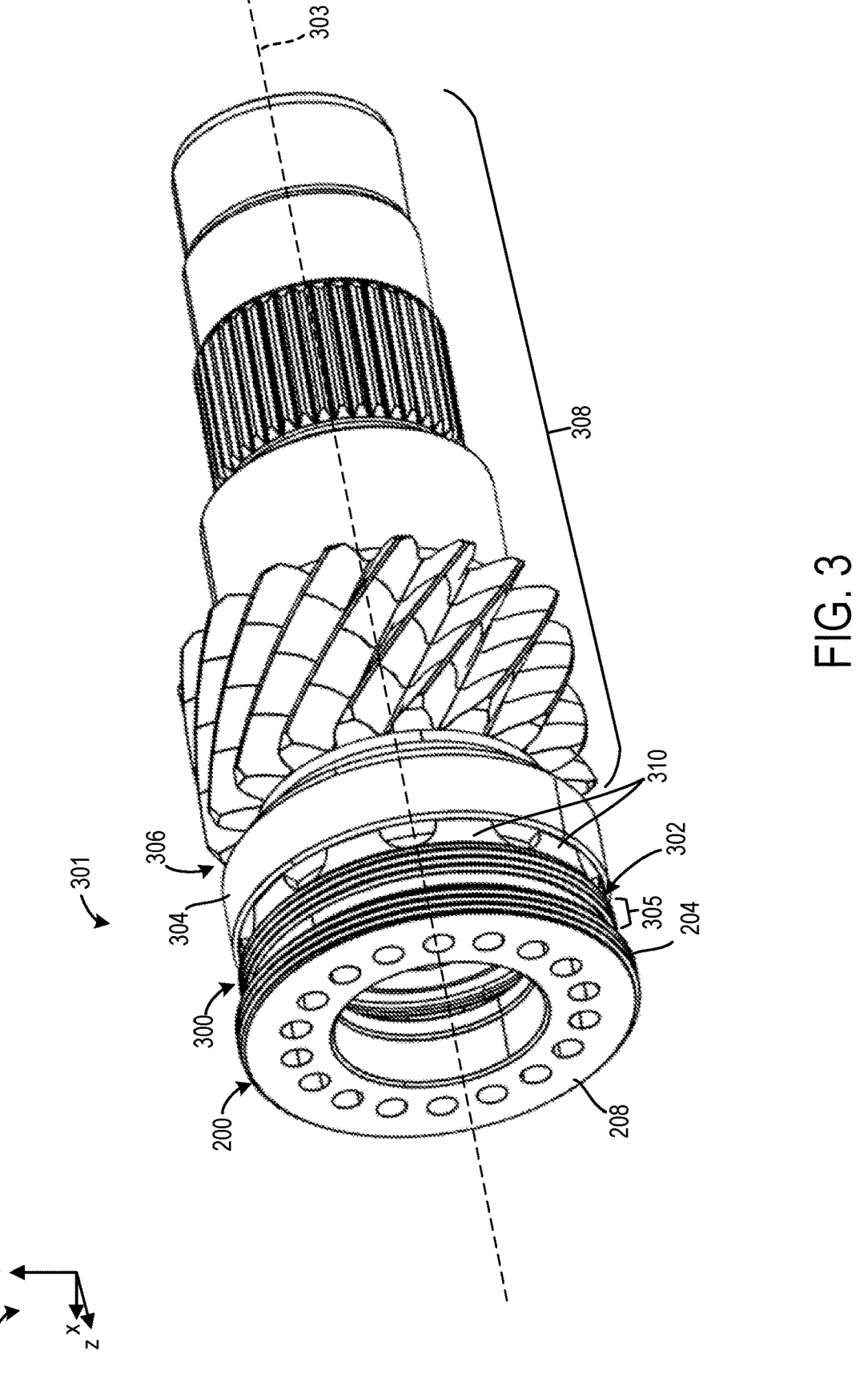
FIG. 3 shows a first example of a bearing assembly that includes the anti-rotation locking ring of FIGS. 2A-2B.

The anti-rotation locking ring 200 may have a front face 206 and a back face 208, both faces being co-planar with the y-x plane. The threaded portion 204a of the outer surface 204 of the anti-rotation locking ring 200 may be proximate to the back face 208 and the unthreaded portion 204b may be proximate to the front face 206. When the anti-rotation locking ring 200 is implemented in a vehicle, the front face 206 may be in face-sharing contact with a surface of a threaded bearing adjuster, as shown in FIG. 3 and described below. The back face 208 may be in face-sharing contact with a surface of a stationary component, such as the differential casing, or the transmission/electrical gearbox housing or cover.

The central opening 202 of the anti-rotation locking ring 200 may have a diameter 210, which is also an inner diameter of the anti-rotation locking ring 200, that reduces a weight of the anti-rotation locking ring 200 without compromising a structural integrity thereof. For example, a width 212 of the anti-rotation locking ring 200 may be configured to withstand an anticipated amount of force applied to the anti-rotation locking ring 200 when installed in the stationary component while maintaining the weight of the anti-rotation locking ring 200 as light as possible. The weight of the anti-rotation locking ring 200 may be further decreased by disposing a plurality of apertures 214 in the anti-rotation locking ring 200, within the width 212 of the anti-rotation locking ring 200.

The plurality of apertures 214 may be distributed evenly around a circumference of the anti-rotation locking ring 200, where the plurality of apertures 214 may be through-holes with the plurality of apertures 214 extending through both faces of the anti-rotation locking ring 200 along the central axis of rotation 250, as shown in FIGS. 2A-2B, or may be blind-holes with the plurality of apertures 214 extending into only the back face 208 of the anti-rotation locking ring 200, in other examples. As such, the plurality of apertures 214 may extend into at least a portion of the thickness 205 of the anti-rotation locking ring 200. In addition to reducing the weight of the anti-rotation locking ring 200, the plurality of apertures 214 may allow a tool, such as a spanner, to be used to install the anti-rotation locking ring 200 in the stationary component, adjust a position of the anti-rotation locking ring 200 in the stationary component, and remove the anti-rotation locking ring 200 from the stationary component.

The anti-rotation locking ring 200 may be configured to maintain a target amount of preload at a bearing, as described above. For example, the anti-rotation locking ring 200 may be included in a first example of a bearing assembly 301, as depicted in FIG. 3. A central axis of rotation 303 of the bearing assembly 301 may be aligned with the z-axis. The bearing assembly 301 may include the anti-rotation locking ring 200, a threaded bearing adjuster 300, a bearing 304, and an input shaft 308. The front face 206 (as shown in FIG. 2B) of the anti-rotation locking ring 200 may be in face-sharing contact with a first side (e.g., a first side 412 shown in FIG. 4) of the threaded bearing adjuster 300. At a second side of the threaded bearing adjuster 300, opposite of the first face, the threaded bearing adjuster 300 may be in contact with the bearing 304, which may be a tapered roller bearing. The bearing 304 may be sandwiched between the threaded bearing adjuster 300 and an end 306 of the input shaft 308.

At least a portion of an outer surface 302 of the threaded bearing adjuster 300 may be threaded, e.g., a threaded portion 305 of the outer surface 302, similar to the threaded portion 204a of the outer surface 204 of the anti-rotation locking ring 200. The threaded bearing adjuster 300 also has detents 310 extending away from the threaded portion 305 along the central axis of rotation 303, where outer surfaces of the detents 310 are not threaded. The threading of the anti-rotation locking ring 200 may wind around the outer surface 204 of the anti-rotation locking ring 200 in a first rotational direction. It will be appreciated that reference to first and second rotational directions refers to rotational directions when observed from a common perspective, such as along the positive z-direction, for example.

Threading disposed at the outer surface 302 of the threaded bearing adjuster 300 may wind around a circumference of the outer surface 302 along the threaded portion 305 in a second rotational direction, opposite of the first rotational direction. As such, when both of the anti-rotation locking ring 200 and the threaded bearing adjuster 300 are installed in a threaded seat of the stationary component, the anti-rotation locking ring 200 may be installed in a clockwise direction while the threaded bearing adjuster 300 may be installed in a counter-clockwise direction. Alternatively, the anti-rotation locking ring 200 may be installed in the counterclockwise direction while the threaded bearing adjuster 300 may be installed in the clockwise direction. As a result, when the anti-rotation locking ring 200 is installed in the stationary component after the threaded bearing adjuster 300 is already inserted, rotation of the anti-rotation locking ring 200 until the anti-rotation locking ring 200 is pressed snugly against the threaded bearing adjuster 300 does not affect a position of the threaded bearing adjust 300 within the threaded seat of the stationary component.

Figure 4:
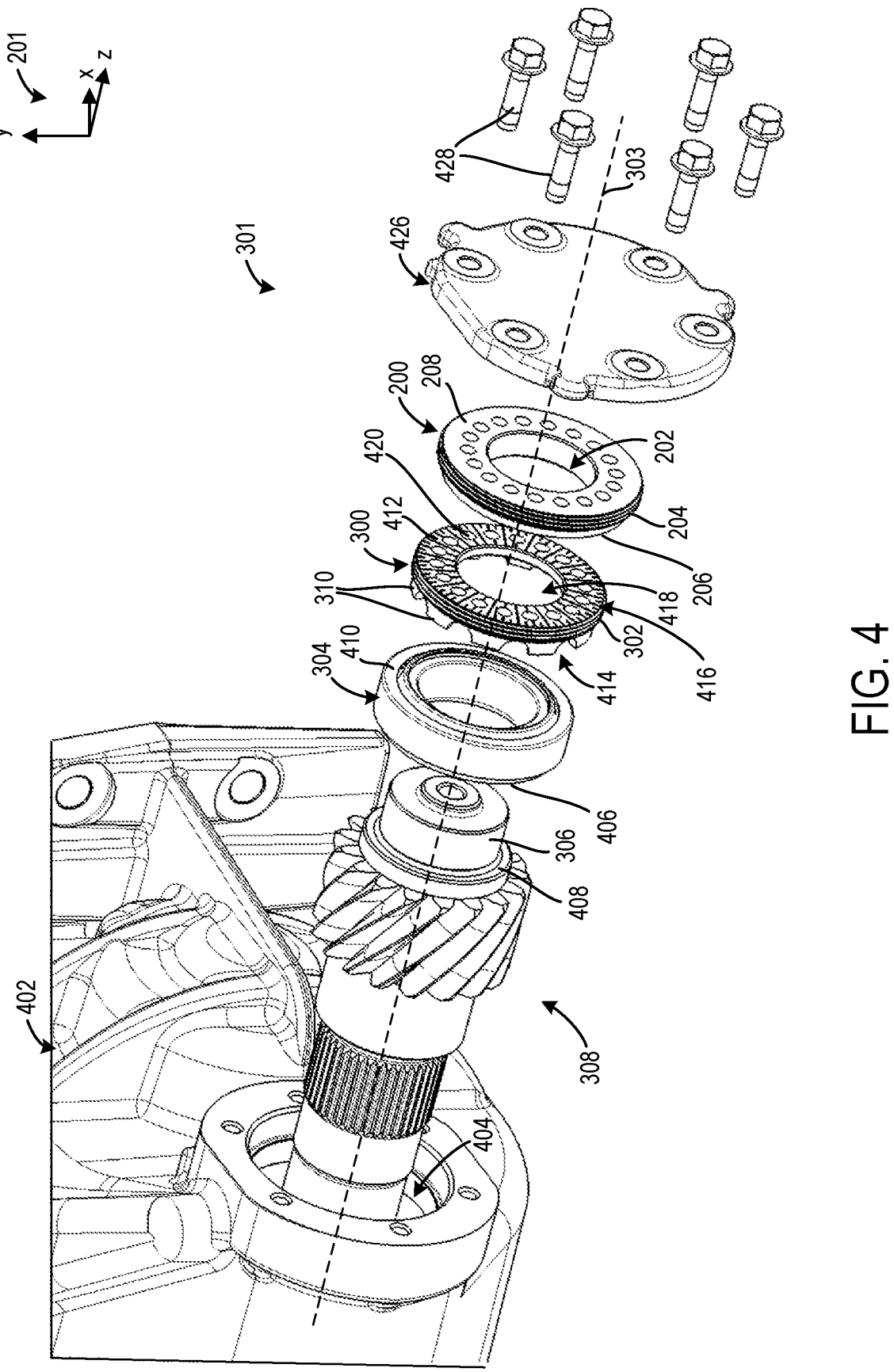
FIG. 4 shows an exploded view of the bearing assembly of FIG. 3.

The bearing assembly 301 is illustrated in FIG. 4 in an exploded view, relative to a first example of an electric gearbox housing 402, which may be an embodiment of the electric gearbox (or transmission) 108 of FIG. 1. The electric gearbox housing 402 may include a tapped bearing seat 404 in which the bearing assembly 301 may be located. The tapped bearing seat 404 may be an opening in the electric gearbox housing 402 configured to receive the bearing assembly 301, where the tapped bearing seat 404 may be a threaded receiving seat for the bearing assembly 301 and the electric gearbox housing 402 may be a component that is stationary relative to the bearing assembly 301. An inner surface of the tapped bearing seat 404 may be threaded to mate with the threaded outer surface 204 of the anti-rotation locking ring 200 as well as with the threaded outer surface 302 of the threaded bearing adjuster 300.

The bearing 304 may circumferentially surround the end 306 of the input shaft 308. For example, an inner diameter of the bearing 304 may be similar to a diameter of the end 306 of the input shaft 308 such that the end 306 of the input shaft 308 may be inserted through the bearing 304. A first edge 406 of the bearing 304 may abut a rim 408 of the input shaft 308, the rim 408 being a barrier to further translation of the bearing 304 along the central axis of rotation 303 in a direction away from the threaded bearing adjuster 300. A second edge 410 of the bearing 304 may be in contact with a second side 414 of the threaded bearing adjuster 300, opposite of the first side 412.

A body 416 of the threaded bearing adjuster 300 may be a flat disc, similar to the anti-rotation locking ring 200, with a central opening 418. Some dimensions of the threaded bearing adjuster 300, such as inner diameter, and thickness (as defined along the z-axis) may be similar to the anti-rotation locking ring 200, although in other examples, the thickness of the threaded bearing adjuster 300 and the inner diameter may vary relative to a thickness and the inner diameter (e.g., the inner diameter 210 of FIGS. 2A-2B) of the anti-rotation locking ring 200. An outer diameter of the threaded bearing adjuster 300 may be smaller than the outer diameter of the anti-rotation locking ring 200, as described below. In other examples, however, the outer diameter of the threaded bearing adjuster 300 may vary relative to the outer diameter of the anti-rotation locking ring 200 without departing from the scope of the present disclosure. The outer diameters of the threaded bearing adjuster 300 and the anti-rotation locking ring 200 may be configured to match an inner diameter of the tapped bearing seat 404 such that the threading along the outer surfaces of the threaded bearing adjuster 300 and the anti-rotation locking ring 200 may engage with the threading along the inner surface of the tapped bearing seat 404, as described above.

Figure 5:
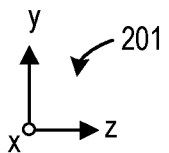
FIG. 5 shows a cross-sectional view of the bearing assembly of FIG. 3.
Figure 6:
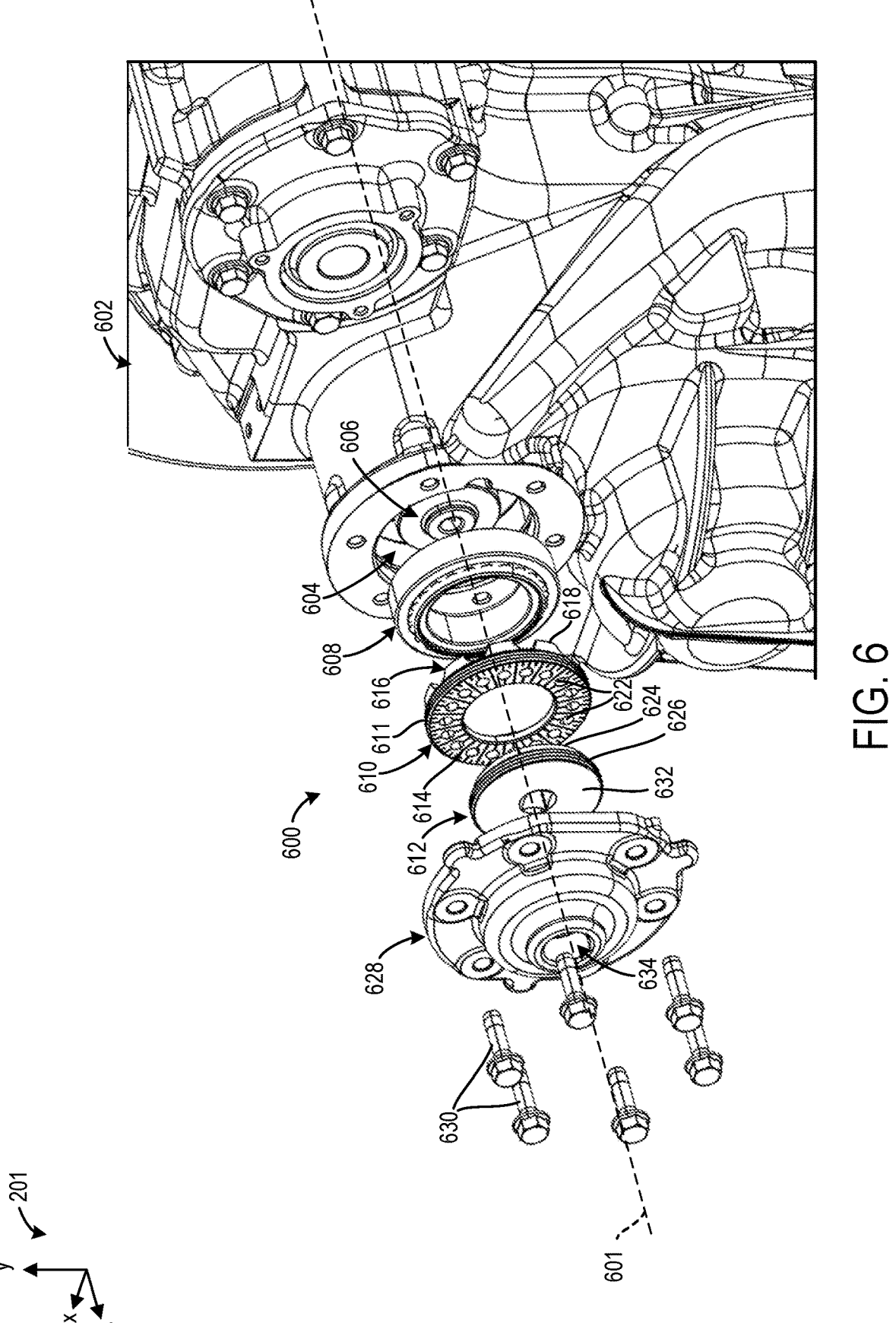
FIG. 6 shows an exploded view of a second example of a bearing assembly that includes an anti-rotation locking ring.

The body 416 of the threaded bearing adjuster 300 may include a plurality of apertures 420 extending through a portion of its thickness as blind-holes, as shown in FIG. 5, or entirely through the thickness of the threaded bearing adjuster 300 as through-holes, in other examples. By configuring the threaded bearing adjuster 300 with the plurality of apertures 420, the tool used to install the anti-rotation locking ring 200, e.g., the spanner, may similarly be used to install, adjust, and remove the threaded bearing adjuster 300 with respect to the tapped bearing seat 404 of the electric gearbox housing 402.

The detents 310 may protrude from the second side 414 of the threaded bearing adjuster 300 along the central axis of rotation 303. The detents 310 may be evenly spaced apart around a perimeter of the second side 414 and may contact the second edge 410 of the bearing 304. A positioning of the detents 310 around the perimeter of the second side 414 of the threaded bearing adjuster 300 allows a force exerted by the threaded bearing adjuster 300 onto the bearing 304 to be evenly distributed around a circumference of the bearing 304.

The first side 412 of the threaded bearing adjuster 300 may be in face-sharing contact with the front face 206 of the anti-rotation locking ring 200 while the back face 208 of the anti-rotation locking ring 200 may be proximate to a cap 426 of the tapped bearing seat 404. As shown in FIG. 5, the back face 208 of the anti-rotation locking ring 200 may be spaced away from an inner surface 508 of the cap 426. The cap 426 may be coupled to the electric gearbox housing 402 via fasteners 428, e.g., bolts, along an external surface of the electric gearbox housing 402 to cover the tapped bearing seat 404. Dirt, fluids, and debris may thereby be blocked from entering the tapped bearing seat 404.

When the bearing assembly 301 is installed in the tapped bearing seat 404 of the electric gearbox housing 402, the bearing assembly 301 may enable smooth and supported rotation of the input shaft 308 and application of preload to the bearing 304. The bearing assembly 301 is depicted in a cross-sectional view in FIG. 5, assembled within the tapped bearing seat 404. The cross-sectional view may be obtained by slicing the bearing assembly 301 and the electric gearbox housing 402 along the y-z plane, through the central axis of rotation 303.

As described previously, the bearing 304 may circumferentially surround and be in contact with the end 306 of the input shaft 308 and may abut the rim 408 of the input shaft 308. An outer surface of the bearing 304 may be in face-sharing contact with an inner surface 502 of the tapped bearing seat 404. The bearing 304 is arranged between the rim 408 of the input shaft 308 and the threaded bearing adjuster 300, with the detents 310 of the threaded bearing adjuster 300 pressed against the second edge 410 of the bearing 304. An outer diameter 432 of the threaded bearing adjuster 300 may be similar to an inner diameter of the tapped bearing seat 404 at a first region 504 of the tapped bearing seat 404 configured to receive the threaded bearing adjuster 300.

For example, when the threaded bearing adjuster 300 is to be installed in the tapped bearing seat 404, the input shaft 308 and the bearing 304 may already be positioned in the tapped bearing seat 404. The threaded bearing adjuster 300 may be inserted into the first region 504 of the tapped bearing seat 404, through an opening of the tapped bearing seat 404 that is to be covered by the cap 426. The threaded bearing adjuster 300 may be translated toward the bearing 304 by engaging the threading along the outer surface 302 of the threaded bearing adjuster 300 with the threading of the first region 504 of the tapped bearing seat 404 and rotating the threaded bearing adjuster 300 along the first rotational direction (such as clockwise, for example).

The threaded bearing adjuster 300 may be rotated along the first rotational direction until the threaded bearing adjuster 300 contacts the bearing 304. The threaded bearing adjuster 300 may be further rotated, e.g., tightened, along the first rotational direction until a target amount of preload is delivered to the bearing 304. When preloaded, the bearing 304 may receive a force from the threaded bearing adjuster 300 that compresses the bearing 304 between the rim 408 of the input shaft 308 and the threaded bearing adjuster 300 by a predetermined amount of pressure. For example, the threaded bearing adjuster 300 may be tightened according to a target torque and angle setting using the tool to provide the target amount of preload. A position of the threaded bearing adjuster 300 within the tapped bearing seat 404 may be locked in place by the anti-rotation locking ring 200.

The anti-rotation locking ring 200 may be installed after the threaded bearing adjuster 300 is seated within the tapped bearing seat 404 by engaging the threading of the outer surface 204 of the anti-rotation locking ring 200 with threading in a second region 506 of the tapped bearing seat 404. The inner diameter of the second region 506 may be similar to an outer diameter 434 of the anti-rotation locking ring 200, which may be larger than the outer diameter 432 of the threaded bearing adjuster 300. The threading of the anti-rotation locking ring 200 may be engaged with the threading of the tapped bearing seat 404 by inserting the anti-rotation locking ring 200 into the second region 506 of the tapped bearing seat 404 and rotating the anti-rotation locking ring 200 along the second rotational direction using, for example, the tool. The anti-rotation locking ring 200 may translate towards the threaded bearing adjuster 300 as it is rotated along the second rotational direction until the anti-rotation locking ring 200 presses, e.g., is tightened, against the threaded bearing adjuster 300 and cannot continue rotating. The cap 426 may then be fastened to the electric gearbox housing 402 using the fasteners 428.

By configuring the threaded bearing adjuster 300 and the anti-rotation locking ring 200 with opposing threading, loosening of the threaded bearing adjuster 300 and loss of preload at the bearing 304 may be circumvented. For instance, when vibrations and oscillations during vehicle operation causes both the threaded bearing adjuster 300 and the anti-rotation locking ring 200 to rotate in the second rotational direction (which would otherwise loosen the threaded bearing adjuster 300), the anti-rotation locking ring 200 is compelled to tighten against the threaded bearing adjuster 300, countering loosening of the threaded bearing adjuster 300. Axial translation of the threaded bearing adjuster 300 away from the bearing 304 is thereby inhibited.

For the electric gearbox housing 402 of FIGS. 4-5, all components of the bearing assembly may be coupled to the electric gearbox housing 402 within the tapped bearing seat 404. In other examples, however, components of a bearing assembly may be coupled to different regions of a stationary component, as shown in FIG. 6 in an exploded view of a second example of a bearing assembly 600 for a vehicle. The bearing assembly 600 has a central axis of rotation 601 that is parallel with the z-axis and may be installed in a second example of an electric gearbox housing 602. The bearing assembly 600 is shown in an assembled configuration with the electric gearbox housing 602 omitted in FIG. 7.

The electric gearbox housing 602 has a tapped bearing seat 604 that is an opening with a threaded inner surface configured to receive at least a portion of the bearing assembly 600 and an end of an input shaft 606. In one example, a bearing 608, such as a tapered roller bearing, and a threaded bearing adjuster 610 of the bearing assembly 600 may be installed in the tapped bearing seat 604. The threaded bearing adjuster 610 may be similarly shaped as the threaded bearing adjuster 300 of FIGS. 3-5 and may be arranged between the bearing 608 and an anti-rotation locking ring 612 of the bearing assembly 600. For example, as shown in FIG. 7, a first edge 702 of the bearing 608 may be in contact with the input shaft 606 and a second edge 704 of the bearing 608 may be in contact with detents 618 of the threaded bearing adjusted 610.

An outer surface 611 of the threaded bearing adjuster 610 may include threading configured to engage with the threading at the inner surface of the electric gearbox housing 602. The threading may wind around the outer surface 611 along a first rotational direction, e.g., clockwise or counterclockwise.

Figure 7:
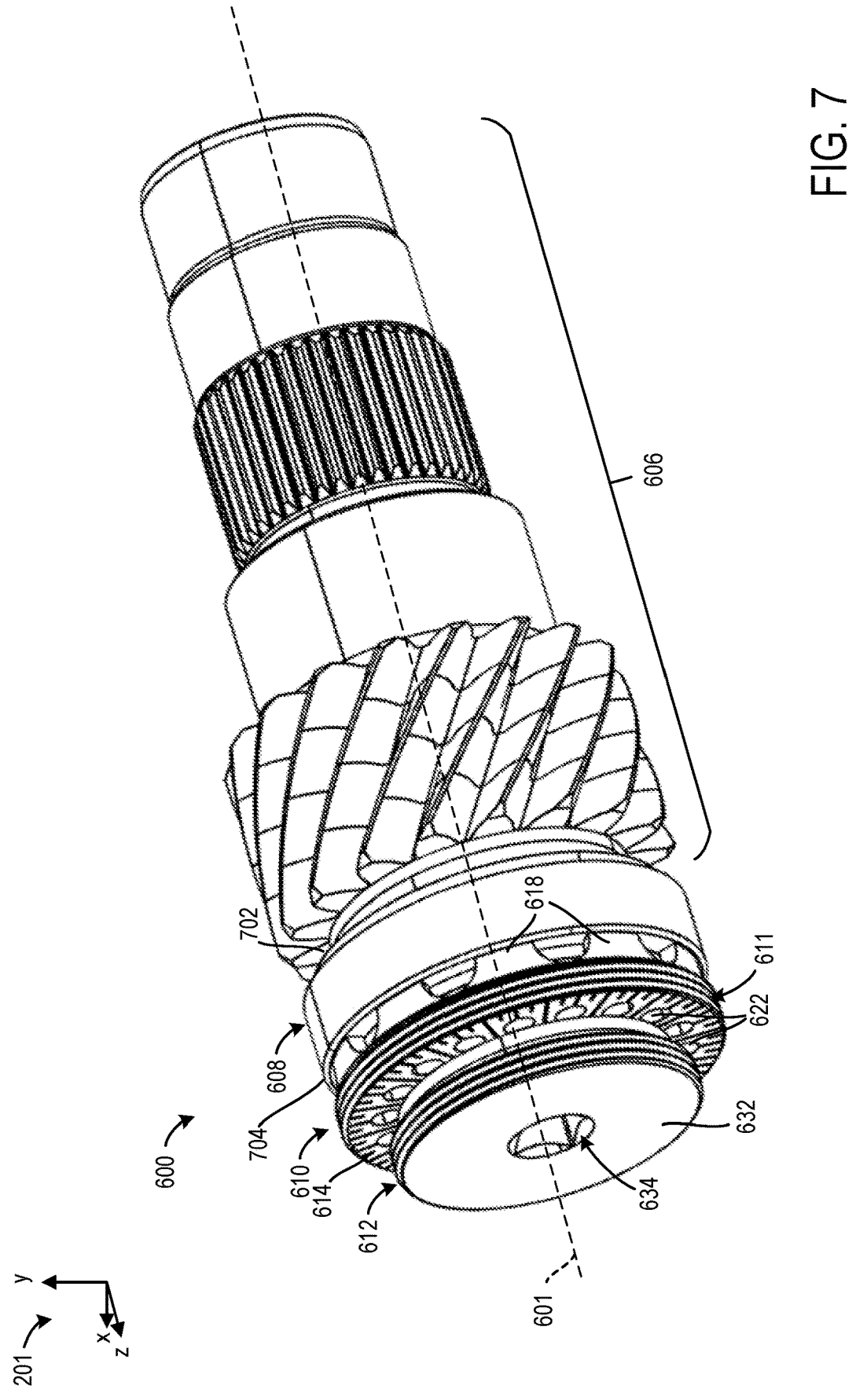
FIG. 7 shows the bearing assembly of FIG. 6 from a perspective view.

As described above with respect to the threaded bearing adjuster 300 of FIGS. 3-5, the threaded bearing adjuster 610 depicted in FIGS. 6 and 7 has a planar first side 614 and a second side 616 with the detents 618 protruding therefrom, along the central axis of rotation 601. The detents 618 may be pressed against, e.g., abut, the second edge 704 of the bearing 608. The planar first side 614 of the threaded bearing adjuster 610 has a plurality of apertures 622, which may be blind-holes or through-holes. As described previously, the plurality of apertures 622 of the threaded bearing adjuster 610 allows a tool, such as spanner to be used to install the threaded bearing adjuster 610 in the tapped bearing seat 604 and also reduces a weight of the threaded bearing adjuster 610.

The first side 614 of the threaded bearing adjuster 610 may be in contact with a front face 624 of the anti-rotation locking ring 612. In one example, the anti-rotation locking ring 612 has an outer surface 626 that includes threading that winds around the outer surface 626 in a second rotational direction that is opposite of the first rotational direction. In other words, the anti-rotation locking ring 612 and the threaded bearing adjuster 610 have threading that winds opposite of one another. However, in other examples, the threading of the anti-rotation locking ring 612 may wind around the outer surface 626 in the first rotational direction.

The winding of the threading at the anti-rotation locking ring 612 may depend on threading disposed in a cap 628.

The threading of the outer surface 626 of the anti-rotation locking ring 612 may be configured to engage with the threading of the cap 628, which covers an opening of the tapped bearing seat 604. The cap 628 may be fastened to the electric gearbox housing 602 via fasteners 630, such as bolts. The anti-rotation locking ring 612 may therefore be coupled to a different region of an electric gearbox than the threaded bearing adjuster 610 and the bearing 608.

In a first configuration, the threading of the cap 628 may wind in a same direction as the threading of the tapped bearing seat 604. The threading of the anti-rotation locking ring 612 may wind around the anti-rotation locking ring 612 in the second rotational direction. Alternatively, in a second configuration, the threading of the cap 628 may instead wind in an opposite direction relative to the threading of the tapped bearing seat 604. In such an example, the threading of the anti-rotation locking ring 612 may wind around the anti-rotation locking ring 612 in the first rotational direction. In either configuration, rotation of the threaded bearing adjuster 610 and the anti-rotation locking ring 612 in a common rotational direction causes the threaded bearing adjuster 610 and the anti-rotation locking ring 612 to translate in opposite axial directions.

In contrast to the anti-rotation locking ring 200 of FIGS. 2A-5, a back face 632 and the front face 624 of the anti-rotation locking ring 612 of FIG. 6 maybe continuous and uninterrupted. In other example, however, the anti-rotation locking ring 612 may also include a plurality of apertures distributed around a circumference of the anti-rotation locking ring 612 as through-holes (e.g., as shown in FIGS. 2A-2B) or blind-holes. A central opening 634 of the anti-rotation locking ring 200 may be smaller than the central opening 202 of the anti-rotation locking ring 200 of FIGS. 2A-5. For example, a ratio of the inner diameter 210 of the anti-rotation locking ring 200 (as shown in FIGS. 2A-2B), relative to its outer diameter 434 (as shown in FIG. 4) may be greater than a corresponding ratio of inner to outer diameter for the anti-rotation locking ring 612 of FIGS. 6-7.

The central opening 634 of the anti-rotation locking ring 612 may have a variety of geometries, e.g., as viewed along the central axis of rotation 601. For example, the central opening 634 may be square, circular, hexagonal, etc., to accommodate a desired type of tool used to install and remove the anti-rotation locking ring 612 from the cap 628. The geometry and size of the central opening 634 may enable common tools, such as screwdrivers, to be used to manipulate the anti-rotation locking ring 612.

Figure 8:
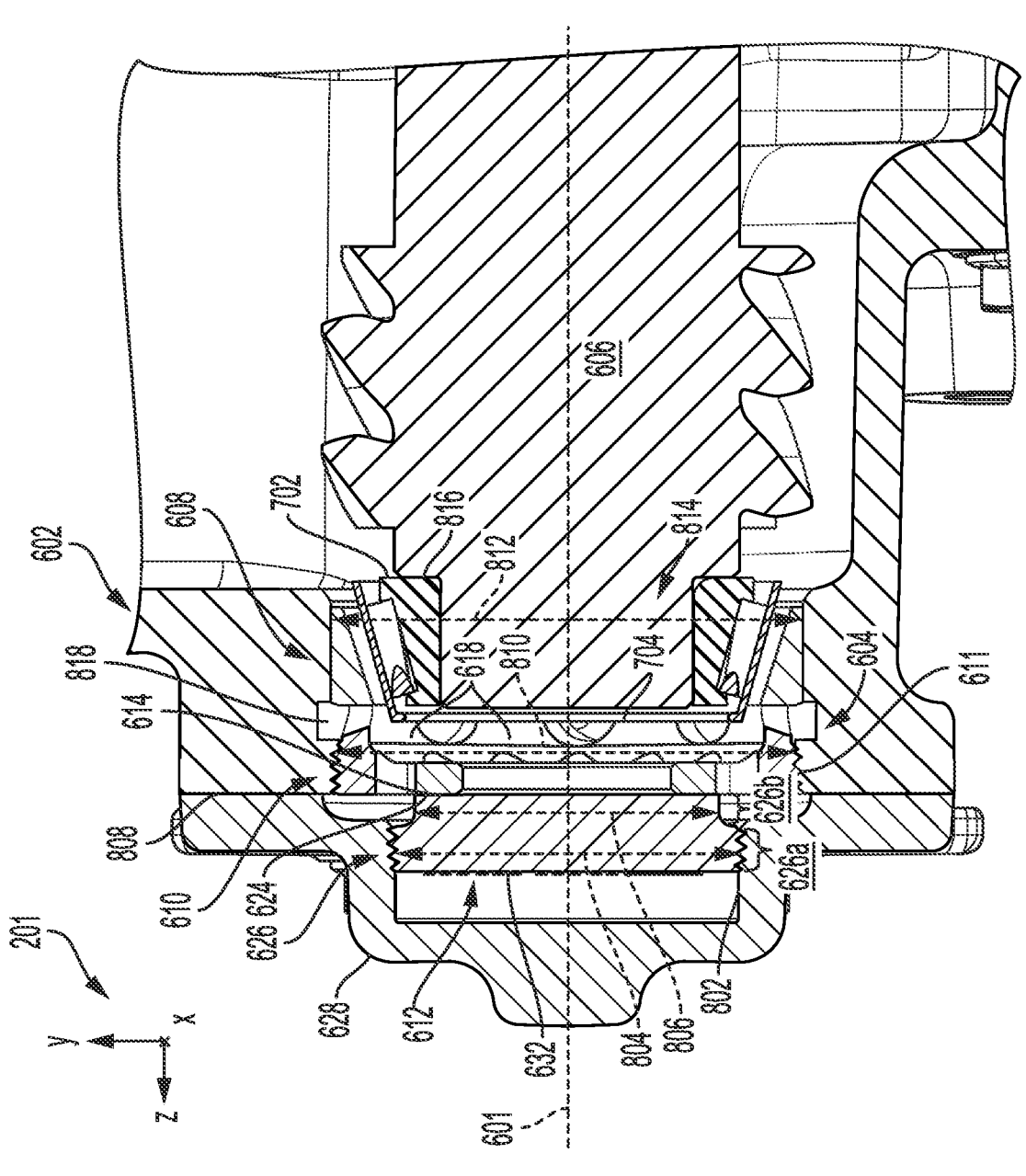
FIG. 8 shows a cross-sectional view of the bearing assembly of FIG. 6.
Figure 9:
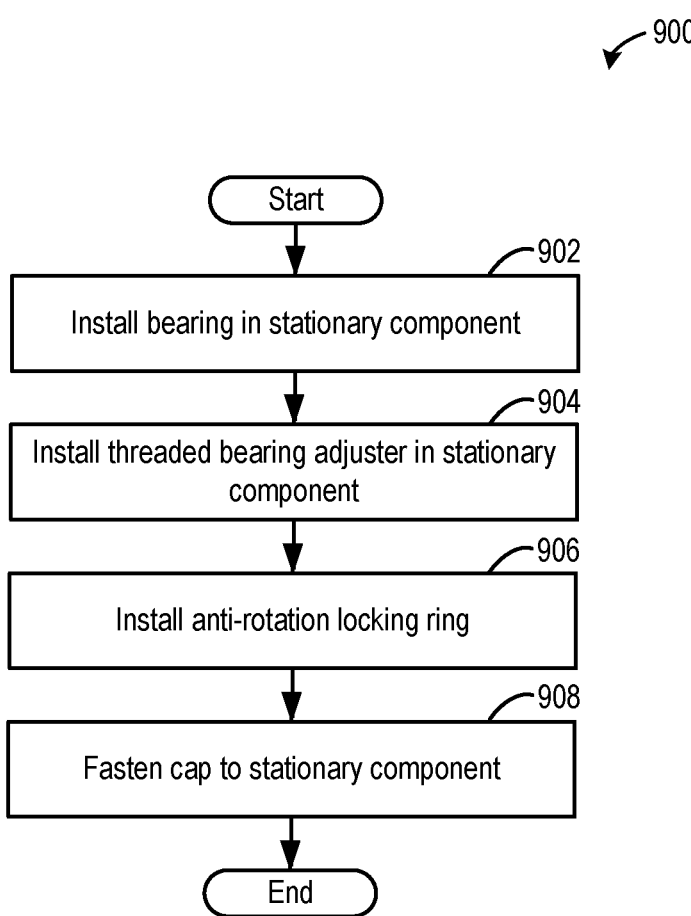
FIG. 9 shows an example of a method for installing a bearing assembly in a stationary component of a vehicle.

A cross-sectional view is illustrated in FIG. 8 of the bearing assembly 600 of FIGS. 6-7, which is installed in the electric gearbox housing 602 of FIG. 6. The cross-sectional view may be obtained by slicing the bearing assembly 600 along the y-x plane through the central axis of rotation 601. The cap 628 is coupled to the electric gearbox housing 602 and the anti-rotation locking ring 612 is disposed inside of an inner volume of the cap 628. For example, the outer surface 626 of the has a threaded portion 626a and an unthreaded portion 626b. The threaded portion 626a may have threading that engages with threading along an inner surface 802 of the cap 628. The anti-rotation locking ring 612 may be fastened to and tightened within the cap 628 by rotating the anti-rotation locking ring 612 along a rotational direction (e.g., clockwise or counterclockwise) using a tool such as a spanner or a screwdriver.

When the anti-rotation locking ring 612 is installed in the cap 628, the threaded portion 626a of the outer surface 626 of the anti-rotation locking ring 612 may be in contact with the inner surface 802 of the cap 628. A diameter 804 of the anti-rotation locking ring 612 at the threaded portion 626a may be larger than a diameter 806 of the anti-rotation locking ring 612 at the unthreaded portion 626b. The unthreaded portion 626b of the outer surface 626 of the anti-rotation locking ring 612 does not contact the inner surface 802 of the cap 628. The back face 632 of the anti-rotation locking ring 612 may be spaced away from and not in contact with the inner surface 802 of the cap 628. The front face 624 of the anti-rotation locking ring 612 may be flush with a forward face 808 of the cap 628, the forward face 808 in face-sharing contact with a surface of the electric gearbox housing 602.

The threading of the inner surface 802 of the cap 628 may be configured such that when the anti-rotation locking ring 612 is tightened into the cap 628, the front face 624 of the anti-rotation locking ring 612 may be in face-sharing contact with the first side 614 of the threaded bearing adjuster 610. The threaded bearing adjuster 610 may be coupled to the threaded inner surface of the tapped bearing seat 604 by engaging the threading of the outer surface 611 of the threaded bearing adjuster 610 with the threading of the tapped bearing set 604 and rotating the threaded bearing adjuster 610 using a tool, such as a spanner.

The threading of the threaded bearing adjuster 610 may be configured such that rotation of both components in the first rotational direction causes the anti-rotation locking ring 612 to translate along the central axis of rotation 601 away from the threaded bearing adjuster 610 (e.g., the anti-rotation locking ring 612 is tightened into the cap 628) and the threaded bearing adjuster 610 to translate toward the bearing 608 (e.g., the threaded bearing adjuster 610 is tightened into the tapped bearing seat 604). Rotating the threaded bearing adjuster 610 in a second rotational direction, opposite of the first rotational direction, therefore loosens the threaded bearing adjuster 610 within the tapped bearing seat 604 and translates the threaded bearing adjuster 610 away from the bearing 608. Further, rotating the anti-rotation locking ring 612 in the second rotational direction, loosens the anti-rotation locking ring 612 within the cap 628 and translates the anti-rotation locking ring 612 towards the threaded bearing adjuster 610. Thus, when motion of the vehicle causes the threaded bearing adjuster 610 to rotate in the second rotational direction, loosening of the threaded bearing adjuster 610 (and loss of preload) is inhibited by the anti-rotation locking ring 612.

As the threaded bearing adjuster 610 is tightened via rotation in the second rotational direction, the detents 618 of the threaded bearing adjuster 610 may contact the second edge 704 of the bearing 608 and press against the bearing 608. The threaded bearing adjuster 610 may be tightened according to a predetermined target amount of preload to be delivered to the bearing 608. Force exerted on the bearing 608 by the threaded bearing adjuster 610 may be distributed evenly around a circumference of the bearing 608 by the detents 618, as described previously.

An outer diameter 810 of the threaded bearing adjuster 610, which may be similar to an inner diameter of the tapped bearing seat 604, may be greater than the outer diameter 804 of the anti-rotation locking ring 612 at the threaded portion 626a of its outer surface 626. The outer diameter 810 of the threaded bearing adjuster 610 may be also similar to an outer diameter 812 of the bearing 608. The bearing 608 may circumferentially surround a narrowed end 814 of the input shaft. The first edge 702 of the bearing 608 may abut a rim 816 of the input shaft 606, which inhibits axial translation of the bearing 608 along the central axis of rotation 601 away from the threaded bearing adjuster 610. As such, the bearing 608 may be compressed between the threaded bearing adjuster 610 and the rim 816 of the input shaft 606 when preload is applied to the bearing 608.

In one example, by positioning the anti-rotation locking ring 612 in the cap 628, rather than in the tapped bearing seat 604, a positioning of the threaded bearing adjuster 610 and the bearing 608 may accommodate an oil passage 818 configured to deliver a lubricant to the bearing assembly 600. More specifically, the oil passage 818 may be located proximate to the detents 618 of the threaded bearing adjuster 610 to allow the lubricant to reach the bearing 608. Incorporation of the anti-rotation locking ring 612 may therefore be achieved in a flexible manner that allows the anti-rotation locking ring 612 to be retrofit to an already existing stationary component configuration.

In this way, preload may be provided precisely and maintained at a bearing of a vehicle via a threaded bearing adjuster. By positioning an anti-rotation locking ring in face-sharing contact with the threaded bearing adjuster, on a side of the threaded adjuster opposite of the bearing, axial translation of the threaded bearing adjuster away from the bearing during vehicle operation may be circumvented. Each of the anti-rotation locking ring and the threaded bearing adjuster may have threaded outer surfaces that wind, relative to one another, in rotational directions that causes the anti-rotation locking ring to block axial shifting of the threaded bearing adjuster away from the bearing. The anti-rotation locking ring may be readily installed using conventional tools and provides a simple, low cost device for providing a target amount of preload to the bearing while mitigating loss of preload during vehicle operation. In addition, incorporation of the anti-rotation locking ring may allow more simple and cost-effective threaded bearing adjusters to be used. A useful life of the bearing and of an input shaft coupled to the bearing may be prolonged as a result.

A method 900 is shown in FIG. 9 for installing a bearing assembly in a stationary component of a vehicle, such as a differential carrier, a transmission housing, or an electric gearbox housing. The bearing assembly may be the bearing assembly 301 of FIGS. 3-5 or the bearing assembly 600 of FIGS. 6-8. An input shaft may be at least partially enclosed in the stationary component and coupled to the bearing assembly. The method may be executed by an operator, by assembly equipment and machines, or by a combination thereof.

At 902, the method includes installing a bearing of the bearing assembly by inserting the bearing into a tapped bearing seat of the stationary component. In one example, the bearing may be a tapered roller bearing. The bearing may be inserted into the tapped bearing assembly until the bearing abuts a rim of the input shaft. A threaded bearing adjuster is installed in the stationary component at 904. The threaded bearing adjuster may be installed using a tool, such as a spanner, by engaging threading along an outer surface of the threaded bearing adjuster with threading disposed along an inner surface of the tapped bearing seat. Using the tool, the threaded bearing adjuster may be rotated along a first rotational direction until the threaded bearing adjuster is in contact with the bearing. The threaded bearing adjuster may be further tightened against the bearing to apply a target amount of preload to the bearing, according to a torque and angle setting on the tool.

At 906, an anti-rotation locking ring of the bearing assembly is installed. The anti-rotation locking ring may be coupled to the tapped bearing seat, as shown in FIGS. 4-5, or to a cap used to cover the tapped bearing seat, as shown in FIGS. 6 and 8. When the anti-rotation locking ring is configured to be installed in the tapped bearing seat, threading along an outer surface of the anti-rotation locking ring winds around the outer surface such that the anti-rotation locking ring is coupled to the threading of the tapped bearing seat by winding the anti-rotation locking ring, e.g., with a tool such as a spanner, in a second rotational direction, opposite of the first rotational direction. Rotation of the anti-rotation locking ring tightens the anti-rotation locking ring into the tapped bearing seat, until the anti-rotation locking ring is in face-sharing contact with the threaded bearing adjuster. When the anti-rotation locking ring abuts the threaded bearing adjuster, a back face of the anti-rotation locking ring, e.g., a face of the anti-rotation locking ring that is not in face-sharing contact the threaded bearing adjuster, may be flush (e.g., even) with a surface of the stationary component.

Alternatively, when the anti-rotation locking ring is configured to be installed in the cap, the threading along the outer surface of the anti-rotation locking ring is engaged with threading disposed along an inner surface of the cap. The anti-rotation locking ring is rotated within the cap, using a tool such as a spanner or a screwdriver, along either the first rotational or the second rotational direction, depending on a configuration of the threading at each of the outer surface of the anti-rotation locking ring and the inner surface of the cap. When the anti-rotation locking ring is rotated until the threading of anti-rotation locking ring reaches a terminal end of the threading in the cap, the anti-rotation locking ring may be tightened into the cap to a maximum extent. Upon maximum tightening of the anti-rotation locking ring into the cap, a front face of the anti-rotation locking ring, e.g., the face of the anti-rotation locking ring facing outwards from the cap, may be flush with a forward face of the cap, where the forward face is configured to be in contact with the stationary component when the cap is fastened thereto.

At 908, the cap is fastened to the stationary component. In examples where the anti-rotation locking ring is installed in the tapped bearing seat, the cap may be fastened to the stationary component via fasteners. When coupled to the stationary component, the inner surface of the cap may be spaced away from the back face of the anti-rotation locking ring. In examples where the anti-rotation locking ring is installed in the cap, the cap may be attached to the stationary component also via fasteners and when the cap is coupled thereto, the front face of the anti-rotation locking ring may be in face-sharing contact with the threaded bearing adjuster.

FIGS. 2A-8 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example. FIGS. 2A-8 are shown approximately to scale.

The disclosure also provides support for a bearing assembly, comprising: a bearing coupled to a shaft, a threaded bearing adjuster in contact with the bearing and configured to apply a target amount of preload to the bearing, and a locking ring in face-sharing contact with the threaded bearing adjuster, the locking ring having an outer surface with threading that, when engaged with threading of a vehicle component, inhibits axial translation of the threaded bearing adjuster away from the bearing. In a first example of the system, the locking ring is a planar disc with a central opening and a plurality of apertures distributed around a circumference of the locking ring. In a second example of the system, optionally including the first example, an outer surface of the threaded bearing adjuster has threading winding around the outer surface of the threaded bearing adjuster along a first rotational direction. In a third example of the system, optionally including one or both of the first and second examples, the threading of the outer surface of the locking ring winds around the outer surface of the locking ring along a second rotational direction, opposite of the first rotational direction. In a fourth example of the system, optionally including one or more or each of the first through third examples, the vehicle component is a drivetrain or powertrain housing and the locking ring and the threaded bearing adjuster are arranged in a tapped bearing seat disposed in the drivetrain or powertrain housing, with the threaded bearing adjuster positioned between the locking ring and the bearing, and wherein the threaded bearing adjuster is installed in the tapped bearing seat by engaging threading of the threaded bearing adjuster with threading of the tapped bearing seat. In a fifth example of the system, optionally including one or more or each of the first through fourth examples, rotation of the threaded bearing adjuster and the locking ring within the tapped bearing seat in a direction causing axial translation of the threaded bearing adjuster away from the bearing causes axial translation of the locking ring towards the threaded bearing adjuster. In a sixth example of the system, optionally including one or more or each of the first through fifth examples, the vehicle component is a cap with a threaded inner surface and the threaded bearing adjuster is arranged in a tapped bearing seat of a housing that the cap is coupled to. In a seventh example of the system, optionally including one or more or each of the first through sixth examples, when the cap is coupled to the housing, the locking ring is in face-sharing contact with the threaded bearing adjuster with the threaded bearing adjuster arranged between the locking ring and the bearing.

The disclosure also provides support for a method for installing a bearing assembly in a vehicle component, comprising: coupling a threaded bearing adjuster to a bearing at a first side of the threaded bearing adjuster by rotating the threaded bearing adjuster in a first rotational direction, and positioning a locking ring in face-sharing contact with a second side of the threaded bearing adjuster, opposite of the first side, wherein the locking ring and the threaded bearing adjuster translate along a central axis of rotation of the bearing assembly in opposite directions when the threaded bearing adjuster and the locking ring are rotated in a common rotational direction. In a first example of the method, rotating the threaded bearing adjuster includes engaging threading of the threaded bearing adjuster with threading of a tapped bearing seat disposed in a housing of the vehicle component. In a second example of the method, optionally including the first example, positioning the locking ring in face-sharing contact with the second side of the threaded bearing adjuster includes engaging threading of the locking ring with the threading of the tapped bearing seat and rotating the locking ring in a second rotational direction, opposite of the first rotational direction until the locking ring is in contact with the threaded bearing adjuster. In a third example of the method, optionally including one or both of the first and second examples, positioning the locking ring in face-sharing contact with the second side of the threaded bearing adjuster includes engaging threading of the locking ring with threading of a cap and tightening the locking ring into the cap, the cap configured to be coupled to the housing of the vehicle component. In a fourth example of the method, optionally including one or more or each of the first through third examples, the locking ring is positioned in face-sharing contact with the second side of the threaded bearing adjuster when the cap is fastened to the housing of the vehicle component. In a fifth example of the method, optionally including one or more or each of the first through fourth examples, the threaded bearing adjuster is rotated in the first rotational direction to press against a tapered roller bearing according to a target torque and angle setting to deliver a target amount of preload to the bearing. In a sixth example of the method, optionally including one or more or each of the first through fifth examples, the vehicle component is a drivetrain or powertrain component, and wherein the bearing is coupled to an input shaft.

The disclosure also provides support for an assembly for a drivetrain or powertrain component, comprising, a bearing seat disposed in a stationary component and having threading disposed along an inner surface of the bearing seat, a tapered roller bearing arranged in the bearing seat, a threaded bearing adjuster abutting the tapered roller bearing and having threading engaged with the threading of the bearing seat, and a locking ring in face-sharing contact with a side of the threaded bearing adjuster opposite of the tapered roller bearing and having a threaded outer surface, wherein rotation of the threaded bearing adjuster and the locking ring in a common rotational direction when the threaded bearing adjuster and the locking ring are installed in the drivetrain or powertrain component causes the threaded bearing adjuster and the locking ring to translate in opposite directions along a central axis of rotation of the assembly. In a first example of the system, the stationary component is a differential housing, a transmission housing, or an electric gearbox housing. In a second example of the system, optionally including the first example, the locking ring has one or more of a plurality of apertures extending through at least a portion of a thickness of the locking ring to receive a spanner and a central opening with a geometry configured to receive a screwdriver. In a third example of the system, optionally including one or both of the first and second examples, an outer surface of the locking ring has a threaded portion proximate to a back face of the locking ring that includes the threading and an unthreaded portion proximate to a front face of the locking ring, and wherein the front face of the locking ring is in face-sharing contact with the threaded bearing adjuster. In a fourth example of the system, optionally including one or more or each of the first through third examples, an amount of preload delivered to the tapered roller bearing by the threaded bearing adjuster is maintained constant by abutting of the threaded bearing adjuster with the locking ring.

In another representation, a drivetrain or powertrain component comprises a housing with a tapped bearing seat including a threaded inner surface, an anti-rotation locking ring having threading engaged with the threaded inner surface of the tapped bearing seat, and a threaded bearing adjuster positioned between the anti-rotation locking ring and a bearing, the threaded bearing adjuster also having threading engaged with the threaded inner surface of the tapped bearing seat, and wherein the threading of the locking ring winds in a rotational direction opposite of the threading of the threaded bearing adjuster. In yet another representation, a drivetrain or powertrain component comprises housing with a tapped bearing seat, a cap configured to cover an opening of the tapped bearing seat, the cap having a threaded inner surface, a threaded bearing adjuster having threading engaged with the tapped bearing seat, and a locking ring having threading engaged with the threaded inner surface of the cap, and wherein when the cap is covering the opening of the tapped bearing seat, rotation of the threaded bearing adjuster and the locking ring in a common rotational direction causes the threaded bearing adjuster and the locking ring to translate along a central axis of rotation in opposite directions.

The following claims particularly point out certain combinations and sub-combinations regarded as novel and nonobvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A vehicle comprising a bearing assembly, comprising:
a bearing coupled to a shaft;
a threaded bearing adjuster in contact with the bearing and configured to apply a target amount of preload to the bearing; and
a locking ring in face-sharing contact with the threaded bearing adjuster, the locking ring having an outer surface with threading that, when engaged with a threaded inner surface of a cap, inhibits axial translation of the threaded bearing adjuster away from the bearing,
wherein the threaded bearing adjuster is arranged in a tapped bearing seat of a housing to which the cap is coupled, and,
wherein, when the cap is coupled to the housing, the locking ring is in face-sharing contact with the threaded bearing adjuster with the threaded bearing adjuster arranged between the locking ring and the bearing.

2. The bearing assembly of claim 1, wherein the locking ring is a planar disc with a central opening and a plurality of apertures distributed around a circumference of the locking ring.

3. The bearing assembly of claim 1, wherein an outer surface of the threaded bearing adjuster has threading winding around the outer surface of the threaded bearing adjuster along a first rotational direction.

4. The bearing assembly of claim 3, wherein the threading of the outer surface of the locking ring winds around the outer surface of the locking ring along a second rotational direction, opposite of the first rotational direction.

5. The bearing assembly of claim 1, wherein the housing is a drivetrain or powertrain housing.

6. A method for installing a bearing assembly in a vehicle component, comprising:
coupling a threaded bearing adjuster to a bearing at a first side of the threaded bearing adjuster by rotating the threaded bearing adjuster in a first rotational direction, wherein rotating the threaded bearing adjuster includes engaging threading of the threaded bearing adjuster with threading of a tapped bearing seat disposed in a housing of the vehicle component; and
positioning a locking ring in face-sharing contact with a second side of the threaded bearing adjuster, opposite of the first side, when a cap is fastened to the housing of the vehicle component, wherein the locking ring and the threaded bearing adjuster translate along a central axis of rotation of the bearing assembly in opposite directions when the threaded bearing adjuster and the locking ring are rotated in a common rotational direction, and wherein positioning the locking ring in face-sharing contact with the second side of the threaded bearing adjuster includes engaging threading of the locking ring with threading of the cap and tightening the locking ring into the cap, the cap configured to be coupled to the housing of the vehicle component.

7. The method of claim 6, wherein the threaded bearing adjuster is rotated in the first rotational direction to press against a tapered roller bearing according to a target torque and angle setting to deliver a target amount of preload to the bearing.

8. The method of claim 6, wherein the vehicle component is a drivetrain or powertrain component, and wherein the bearing is coupled to an input shaft.

9. An assembly for a drivetrain or powertrain component, comprising:
a bearing seat disposed in a stationary component and having threading disposed along an inner surface of the bearing seat;
a tapered roller bearing arranged in the bearing seat;
a threaded bearing adjuster abutting the tapered roller bearing and having threading engaged with the threading of the bearing seat, the threaded bearing adjuster further comprising a plurality of detents that contact an edge of the tapered roller bearing; and
a locking ring in face-sharing contact with a side of the threaded bearing adjuster opposite of the tapered roller bearing and having a threaded outer surface;
wherein rotation of the threaded bearing adjuster and the locking ring in a common rotational direction when the threaded bearing adjuster and the locking ring are installed in the drivetrain or powertrain component causes the threaded bearing adjuster and the locking ring to translate in opposite directions along a central axis of rotation of the assembly.

10. The assembly of claim 9, wherein the stationary component is a differential housing, a transmission housing, or an electric gearbox housing, and wherein outer surfaces of the plurality of detents are not threaded.

11. The assembly of claim 9, wherein the locking ring has one or more of a plurality of apertures extending through at least a portion of a thickness of the locking ring to receive a spanner and a central opening with a geometry configured to receive a screwdriver.

12. The assembly of claim 9, wherein an outer surface of the locking ring has a threaded portion proximate to a back face of the locking ring that includes the threading and an unthreaded portion proximate to a front face of the locking ring, and wherein the front face of the locking ring is in face-sharing contact with the threaded bearing adjuster.

13. The assembly of claim 9, wherein an amount of preload delivered to the tapered roller bearing by the threaded bearing adjuster is maintained constant by abutting of the threaded bearing adjuster with the locking ring, and wherein the plurality of detents extends away from a threaded portion of the threaded bearing adjuster and are evenly spaced apart.

\* \* \* \* \*